United States Patent [19]

Asada

[11] Patent Number: 5,126,761
[45] Date of Patent: Jun. 30, 1992

[54] SCANNING BEAM OUTPUT CONTROL DEVICE FOR AN IMAGE RECORDER

[75] Inventor: Kenichirou Asada, Tokyo, Japan

[73] Assignee: Ricoh Company, Ltd., Tokyo, Japan

[21] Appl. No.: 522,797

[22] Filed: May 14, 1990

[30] Foreign Application Priority Data

May 15, 1989 [JP] Japan .................. 1-118725

[51] Int. Cl.⁵ .................. H04N 1/21
[52] U.S. Cl. .................. 346/108; 358/296
[58] Field of Search .............. 346/107 R, 108, 76 L, 346/160; 358/296, 300, 302

[56] References Cited

U.S. PATENT DOCUMENTS

4,689,482 8/1987 Horikawa et al. .................. 250/205
4,856,011 8/1989 Shimada et al. .................. 372/38

Primary Examiner—Mark J. Reinhart
Attorney, Agent, or Firm—Oblon, Spivak, McClelland, Maier & Neustadt

[57] ABSTRACT

A device applicable to a laser beam printer, color printer, digital copier, facsimile machine or similar image recorder for controlling the output level of a scanning beam to a predetermined level. The device sets the output level of the scanning beam in response to data fed thereto from the outside, thereby coping with changes in image forming conditions and changes in various characteristics due to aging. The device incorporated in a color printer, for example, sets the output levels of individual laser beams in matching relation to the characteristics to individual colors.

13 Claims, 11 Drawing Sheets

SCANNING BEAM OUTPUT CONTROL DEVICE FOR AN IMAGE RECORDER

BACKGROUND OF THE INVENTION

The present invention relates to a device applicable to a laser beam printer, color printer, digital copier, facsimile machine or similar image recorder for controlling the output level of a scanning beam used to form an image to a predetermined level.

Typically, a scanning beam for forming an image as mentioned above is implemented by a semiconductor laser. With image recorders of the type recording an image by manipulating a laser beam, e.g., digital copiers, it is a common practice to set various image forming conditions including image forming speed and magnification (variable by changing the frequency of an image clock) machine by machine before shipping. If such image forming conditions set beforehand can be changed, various kinds of extra control are achievable. For example, when the sensitivity of a photoconductive element installed in a digital copier is changed due to aging. such a change can be compensated for by changing any of the image forming conditions, e.g. the output level of a beam for scanning the photoconductive element.

A color printer or similar image recorder causes each of a plurality of laser beams to irradiate a particular photoconductive element associated therewith. A prerequisite with this kind of image recorder is that the output levels of the individual laser beams be maintained stable. One approach for stabilizing the output levels of laser beams is disclosed in Japanese Patent Application No. 76316/1987. The approach disclosed in this Patent Application uses a plurality of output level detecting means each for monitoring the output level of respective one of a plurality of laser beams. The output levels of all the laser beams are stabilized on the basis of an output signal of particular one of the plurality of output level detecting means. A drawback with this approach is that it does not optimize the output levels of the individual laser beams in conformity to characteristics of toners of different colors. Such a manner of optimization is indispensable considering the fact that in a color printer the conditions for imagewise exposure, in many cases, are not constant due to irregularities in the sensitivity of a photoconductive element and the electrical characteristic of a toner.

SUMMARY OF THE INVENTION

It is therefore an object of the present invention to provide a scanning beam output control device for an image recorder capable of effecting compensation in response to changes in image forming conditions and changes in various characteristics due to aging.

It is another object of the present invention to provide a scanning beam output control device for a color printer or similar image recorder which insures desirable color balance.

It is another object of the present invention to provide a generally improved scanning beam output control device for an image recorder.

In accordance with the present invention, a device for controlling an output level of a scanning beam issuing from a beam source to a predetermined level comprises an output level detecting circuit for detecting an output level of the scanning beam issuing from the beam source, a comparing circuit for comparing an output signal of the output level detecting circuit with a reference signal, an output level setting circuit for setting an output level of the scanning beam in response to an output signal of the comparing circuit, and a reference signal level setting circuit for variably setting a level of the reference signal in response to scanning beam output data which is fed to the device. The output level of the scanning beam is variably set in response to the scanning beam output data.

Also, in accordance with the present invention, an image recorder comprises a deflecting device for deflecting a plurality of scanning beams each having been modulated by an input image signal onto individual photoconductive elements, and output level setting circuits each for setting an output level of respective one of the plurality of scanning means, whereby the output levels of the scanning beams each is variably set by an associated one of the output level setting circuits.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Preferred embodiments of the scanning beam output control device in accordance with the present invention will be described with reference to the accompanying drawings.

First Embodiment

Figure 1:
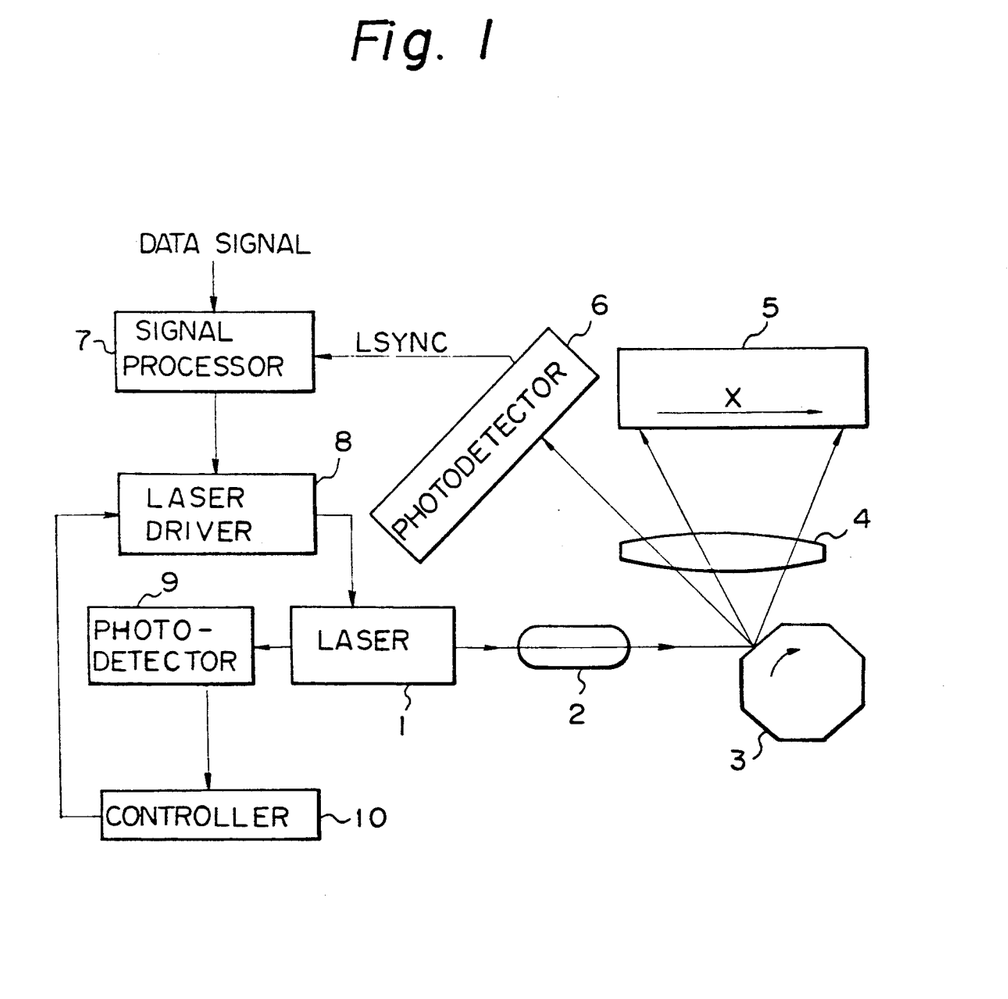
FIG. 1 is a block diagram schematically showing an image recorder implemented as a laser printer and to which a first embodiment of the present invention is applied.

Referring to FIG. 1 of the drawings, a laser printer belonging to a family of image recorders and to which a first embodiment of the present invention is applied is shown. As shown, a laser beam issuing from a semiconductor laser 1 is collimated by a collimator lens 2, deflected by a scanning device 3 implemented as a rotary polygonal mirror, and then focused by an f-theta lens 4 onto a charged surface of a photoconductive element 5 to form a beam spot thereon. As the scanning device 3 is rotated, the beam spot is repetitively moved in a main scanning direction indicated by an arrow X. At the same time, the photoconductive element 5 is rotated and thereby scanned in a subscanning direction. A photodetector 6 is positioned at the outside of a data writing range of the photoconductive element 5 as viewed in the axial direction of the element 5. The photodetector 6 generates a line sync signal LSYNC by detecting the laser beam having been deflected by the scanning device 3. A signal processor 7 applies a data signal or video data to a laser driver 8 at a timing which is controlled by the line sync signal LSYNC.

The laser driver 8 drives the semiconductor laser 1 in response to the data signal fed from the signal processor 7. As a result, the laser beam modulated by the data signal irradiates the photoconductive element 5 to electrostatically form a latent image. A developing unit, not shown, develops the latent image while an image transferring unit transfers the developed image to a paper sheet or similar medium. A laser beam issuing backward from the laser 1 is incident to a photodetector 9 which plays the role of means for detecting the output level of the beam. A controller 10 controls the laser driver 8 in response to the output signal of the photodetector 9 such that the output level of the laser 1 remains constant. Applying the beam issuing backward from the laser 1 to the photodetector 9 as stated is advantageous over applying a part of a laser beam issuing forward to a photodetector, because the former does not lower the output level of the laser beam which can be actually used.

Figure 2:
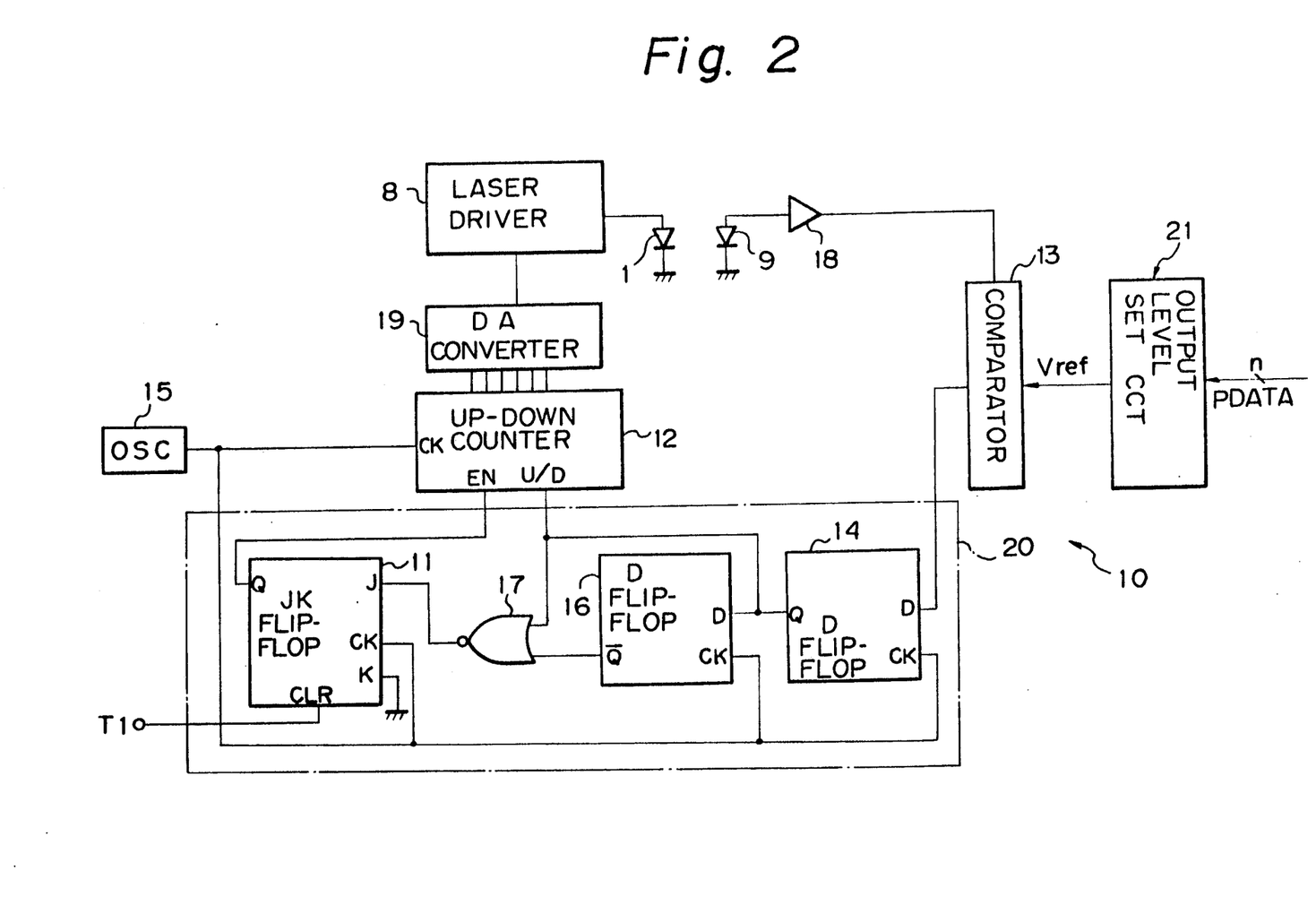
FIG. 2 is a block diagram schematically showing a specific construction of a controller shown in FIG. 1.

FIG. 2 shows a specific construction of the controller 10. In the figure, when a timing signal $T_1$ is applied to the controller 10 for causing the latter to start on an output control operation, a JK flip-flop 11 is cleared so that it turns its output to a low level. This enables an up-down counter 12. A D flip-flop 14 latches an output signal of a comparator 13 in response to a clock signal which is fed thereto from an oscillator 15. The output signal of the D flip-flop 14 is applied to the up-down counter 12 as a count mode signal and, at the same time, fed to a D flip-flop 16. The D flip-flop 16 latches the output of the D flip-flop 14 in response to the clock signal from the oscillator 15. The non-inverted output of the D flip-flop 14 and the inverted output of the D flip-flop 16 are routed to a NOR gate 17. The JK flip-flop 11 is set by the output signal of the NOR gate 17.

The output signal of the photodetector 9 is amplified by an amplifier and then fed to the comparator 13. In response, the comparator 13 compares the beam output level represented by the output signal of the amplifier 13 with the level of a reference voltage Vref and, depending on the result of comparison, produces either a high level signal or a low level signal. Assume that the up-down counter 12 is enabled when the output of the comparator 13 is in a high level, i.e., when the beam output level of the laser 1 is higher than the level of the reference voltage Vref, for example. Then, the counter 12 is operated in a down-count mode by the high level output of the D flip-flop 14. The output of the counter 12 is converted into an analog output by a digital-to-analog (DA) converter 19. A drive current which is fed from the laser driver 8 to the laser 1 varies in association with the output level of the DA converter 19. In this case, the drive current is reduced to in turn lower the output voltage of the amplifier 18. As soon as the output of the comparator 13 turns from a high level to a low level, the output of the D flip-flop 14 turns to a high level with the result that the JK flip-flop 11 is set to disable the up-down counter 12.

Assume that the up-down counter 12 is enabled by the timing signal $T_1$ when the output of the comparator 13 is in a low level, i.e., when the output beam level of the laser 1 is lower than the level of the reference voltage Vref. Then, the counter 12 is operated in an up-count mode by the low level output of the D flip-flop 14. The resultant output of the counter 12 is converted into an analog output by the DA converter 19. The drive current being fed from the laser driver 8 to the laser 1 varies in response to the analog output of the DA converter 19. In this case, the drive current is increased to in turn increase the output voltage of the amplifier 18. On the change of the output of the comparator 13 from a low level to a high level, the output of the D flip-flop 14 turns to a high level. This places the counter 12 into a down-count mode. At this time, the output of the NOR gate 17 remains in a low level and, therefore, the JK flip-flop 11 is not reset, whereby the counter 12 is maintained in the enabled state. In this manner, the counter 12 is disabled only when the beam output level of the laser 1 is lowered below the reference voltage level Vref; the counter 12 is not disabled when the beam output level of the laser 1 is raised above the reference voltage level Vref. Hence, a constant current is applied to the laser 1 at all times.

Alternatively, an arrangement may be made such that the up-down counter 12 is not disabled when the beam output level of the laser 1 is lowered below the reference voltage level Vref and is disabled on the rise of the beam output level above the reference level Vref. This is also successful in maintaining the current being fed to the laser 1 constant. Specifically, in FIG. 2, the section designated by the reference numeral 20 constitutes an edge detector which enables or disables the up-down counter 12 by detecting the changes in the output of the comparator 13. As stated above, the beam output level of the laser 1 is controlled to a constant level so that the output voltage of the amplifier 18 may remain constant.

The output control means using a counter and a DA converter as shown an described is disclosed in, for example, Japanese Patent Laid-Open Publication (Kokai) Nos. 171863/1985, 174786/1986, and 174787/1986.

As described above, the beam output level of the laser 1 is the beam output level appearing when the output produced by the photodetector 9 and amplified by the amplifier 18 and the reference voltage Vref compare equal in level. Hence, in the specific construction shown in FIG. 2, the output level of the amplifier 18 and, therefore, the beam output level of the laser 1 increases with the increase in the level of the reference voltage Vref and decreases with the decrease in the latter.

The data fed from the outside, e.g., scanning beam output date fed from a control section of a printer body or an image processor section may either be analog or digital. Generally, digital data is advantageous over analog data because it is less susceptible to noise and is easier to manipulate. Digital data may be fed in the form of a plurality of bits of parallel data or in the form of serial data, as desired. Such scanning beam output data PDATA, FIG. 2, is held by an output level setting circuit 21 (or not necessarily held when the output level is constantly changed) to set the reference voltage Vref matching the data PDATA. The set reference voltage Vref is applied to the comparator 13.

Figure 3:
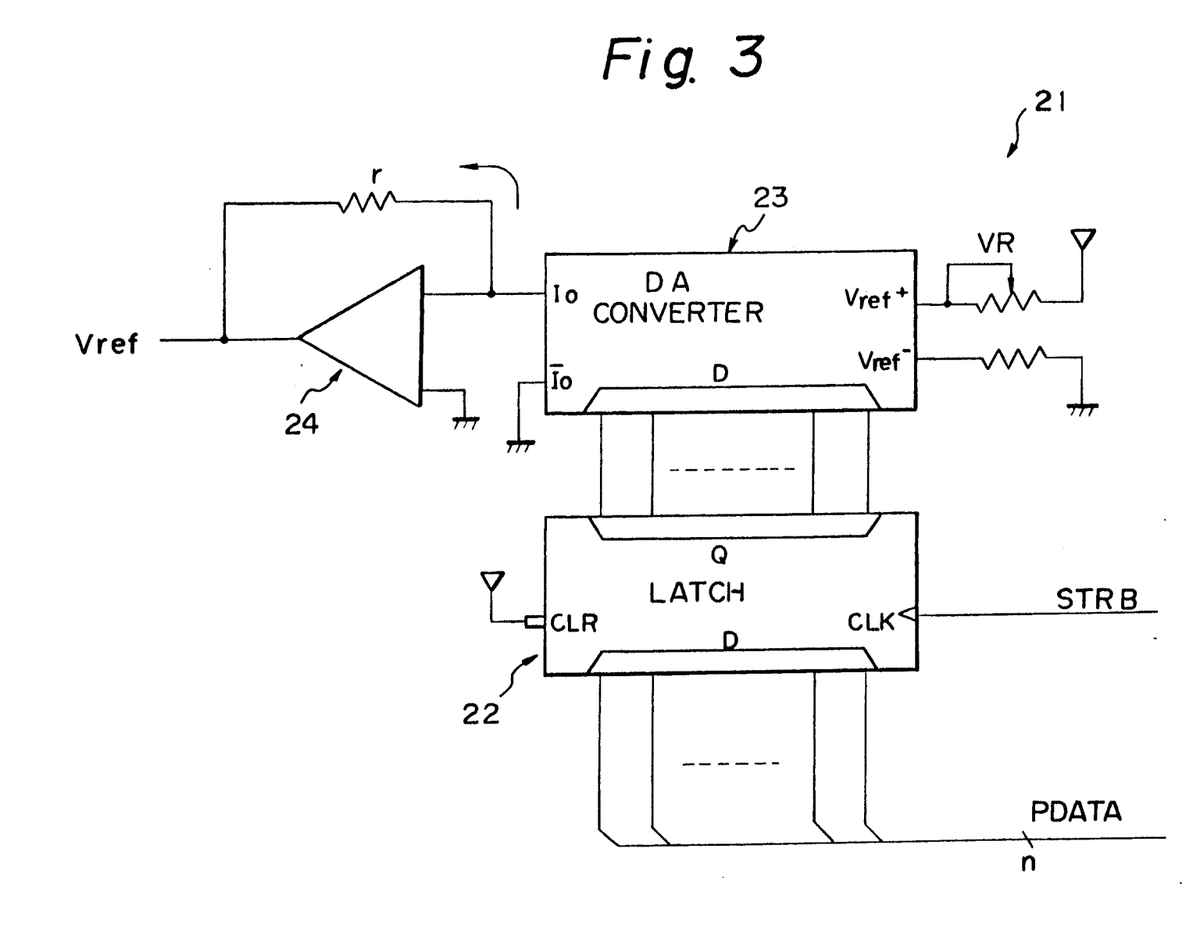
FIG. 3 is a block diagram showing a specific construction of an output level setting circuit shown in FIG. 2.

A specific construction of the output level setting circuit 21 is shown in FIG. 3. As shown, n-bit scanning beam output data PDATA is fed to a latch 22 from the outside in synchronism with a strobe signal STRB. The data PDATA is latched by the latch 22 and applied to a data terminal D of a DA converter 23. Assuming that the DA converter 23 is of a current output type such as "HA17008", then n is "8", and a current i appears on the output terminal I₀ of the DA converter 23 in association with the output of the latch 22. When the comparator 13 is implemented as a general-purpose voltage comparator such as "LM311", for example, the output current i may be transformed by the amplifier 24 into a reference voltage Vref = i·r in matching relation to a resistance r and then fed to the voltage comparator 13. It is to be noted that the output i of the DA converter 23 at the time when the data PDATA has the maximum value is variable on the basis of the resistance VR of the converter 23, and therefore, the variable range of the reference voltage Vref may be adjusted by changing the resistance VR, as desired.

The comparator 13 shown in FIG. 2 may be implemented as a digital comparator, in which case the output level setting circuit 21 of FIG. 3 may be implemented only by the latch 22. In the case that the scanning beam output data is an analog signal, the circuitry 21 of FIG. 3 may be replaced with a conventional analog sample and hold circuit.

As stated above, the illustrative embodiment is capable of variably setting the output level of a scanning beam in matching relation to externally derived data and, therefore, capable of performing compensation in response to changes in the image forming conditions and changes in various characteristics due to aging. This insures high quality images over a long period of time.

Second Embodiment

Figure 4:
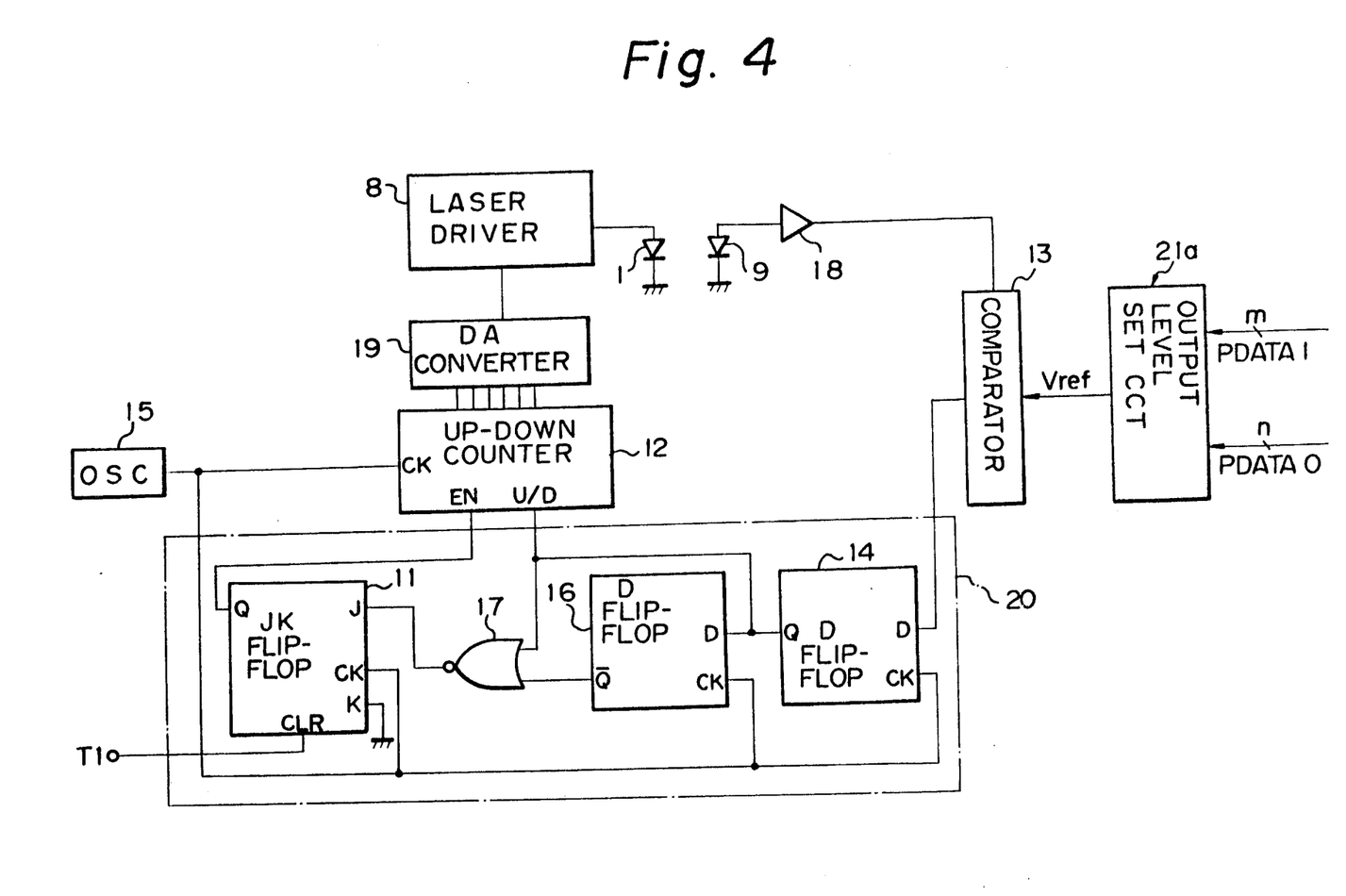
FIG. 4 is a block diagram schematically showing a controller representative of a second embodiment of the present invention.
Figure 5:
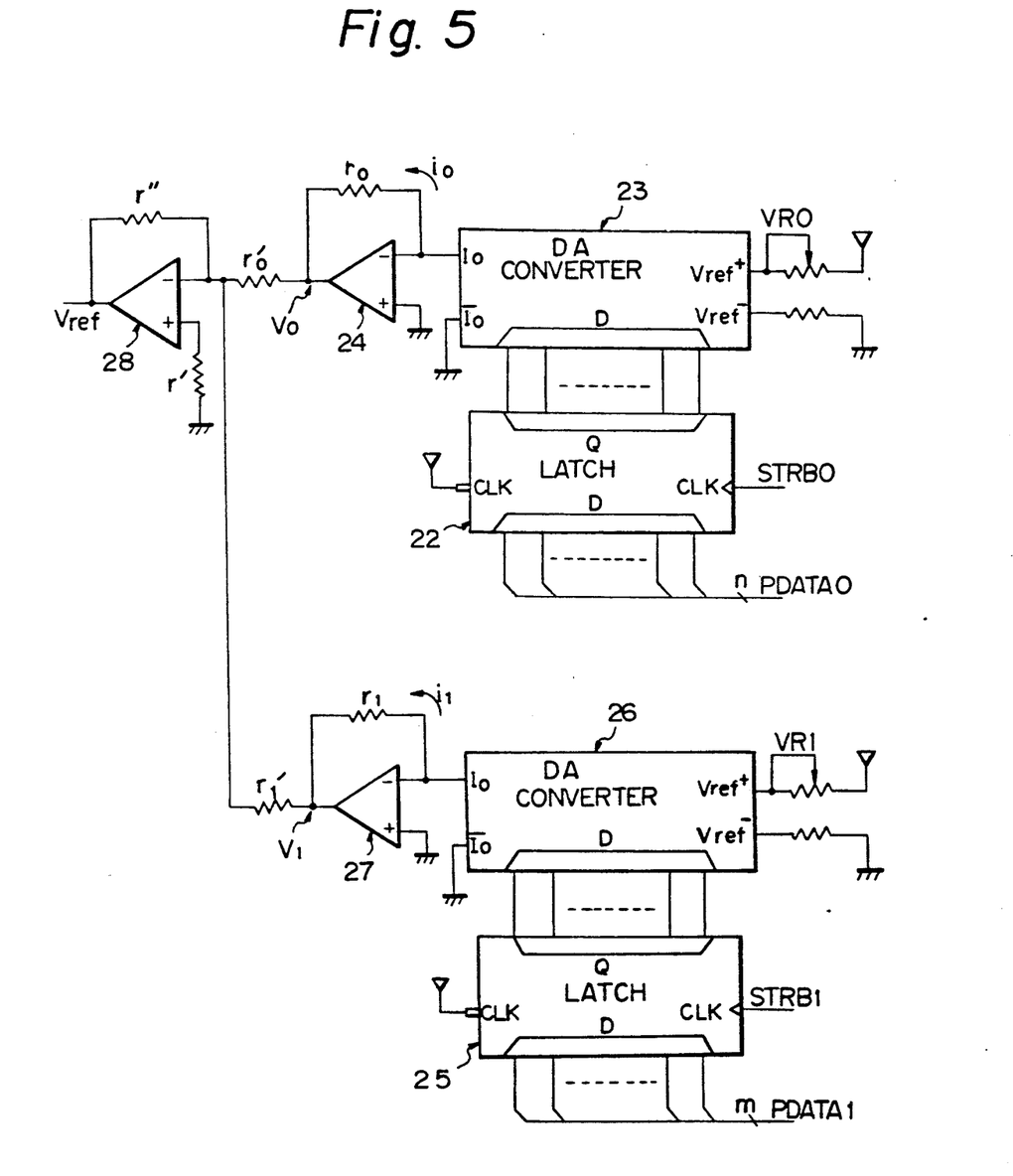
FIG. 5 is a block diagram schematically showing a specific construction of an output level setting circuit shown in FIG. 4.
Figure 6:
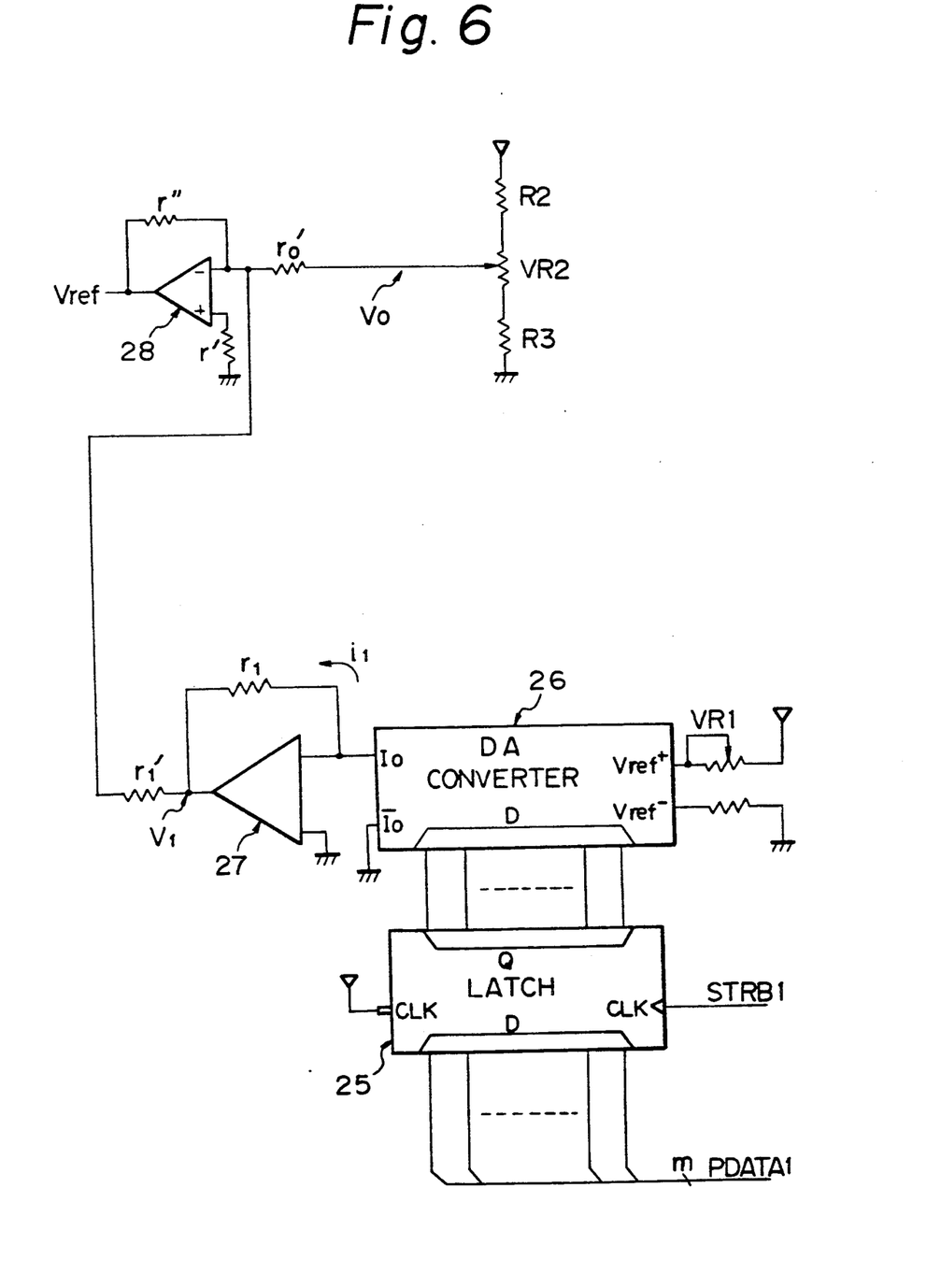
FIG. 6 is a block diagram schematically showing a modified form of the output level setting circuit of FIG. 5.

Referring to FIGS. 4 to 6, a second embodiment of the present invention is shown. In the figures, the same or similar components are designated by like reference numerals, and redundant description will be avoided for simplicity. In this particular embodiment, two different sequences of scanning beam output data are fed from the outside to an output level setting circuit 21a. The latch 22 latches n-bit scanning beam output data PDATA0 which arrives at the circuit 21a in synchronism with a strobe signal STRB0, while the DA converter 23 receives such data PDATA0 at its data terminal. Again, assuming that the DA converter 23 is of a current output type such as "HA17008", then n is "8", and a current $i_0$ appears on the output terminal I₀ of the DA converter 23 in association with the output of the latch 22. The amplifier 24 amplifies the current $i_0$ to produce $V_0 = i_0 \cdot r_0$. A latch 25 latches m-bit scanning beam output data PDATA1 which also arrives at the circuit 21a in synchronism with a strobe signal STRB1. The data PDATA1 is applied to a data terminal of a DA converter 26. Assuming that the DA converter 26 is of the same type as the DA converter 23, then m is "8" (m may not be equal to n). A current $i_1$ appears on the output terminal I₀ of the DA converter 26 in response to the output of the latch 25. An amplifier 27 amplifies the current $i_1$ to produce $V_1 = i_1 \cdot r_1$. In FIG. 5, the reference numeral 28 designates an adder to which the two outputs $V_0$ and $V_1$ are applied. The adder 28 adds the inputs $V_0$ and $V_1$ to produce $$V\text{ref} = \frac{r''}{r_0} V_o + \frac{r''}{r_1} V_1$$

When both the output data PDATA0 and PDATA1 reach their maximum values, the ratios of $V_0$ and $V_1$ to the sum Vref are freely variable on the basis of the ratios of the resistances VR0, VR1, $r_0$ and $r_1$ of the DA converters 23 and 26 and the values $r'_0$, $r'_1$ and $r''$. Specifically, assume a case wherein the output level of the scanning beam is greatly varied by the output data PDATA0 and finely adjusted by the output data PDATA1, it is possible to weight the individual lines.

By adequately selecting the resistances as stated above, it is also possible to select a desired range over which the reference voltage Vref is variable.

Again, if the comparator 13 is implemented as a digital comparator, the output level setting circuit 21a may be composed only of the latches 22 and 25 and a digital adder. When the output data PDATA0 and PDATA1 are analog signals, the circuit 21a may be replaced with an analog sample and hold circuit and an analog adder which are conventional.

The illustrative embodiment is practicable even with three or more difference data sequences if the line having the latch 22, DA converter 23 and amplifier 24 shown in FIG. 5 is increased in number in matching relation to the number of data sequences.

In general, the optical attenuation characteristic of a photoconductive element varies due to aging. Such a variation may be compensated for by changing the output level of a scanning beam. In the specific construction shown in FIG. 5 which sets a beam output level in response to two externally derived data sequences, the compensation may be effected by setting an adequate initial value of first scanning beam output data, which is selectable within the circuitry, and changing second scanning beam output data in response to a change in the characteristic of a photoconductive element. For this purpose, as shown in FIG. 6, the latch 22, DA converter 23 and amplifier 24 of FIG. 5 may be replaced with resistors $R_2$, $VR_2$, and $R_3$. A change in the characteristic of a photoconductive element may be detected by forming a particular pattern on the photoconductive element between successive image forming areas and sensing the surface potential of the pattern. Then, a signal representative of the sensed surface potential will be fed to the output level setting circuit 21a as the above-mentioned internally derived scanning beam output data. The beam output level may be adjusted at any suitable timing, e.g., every time the power switch of equipment is turned on such as in the morning or every time a predetermined number of recordings are produced.

The second embodiment constructed and operated as described above achieves the same advantages as the first embodiment.

THIRD EMBODIMENT

Figure 7:
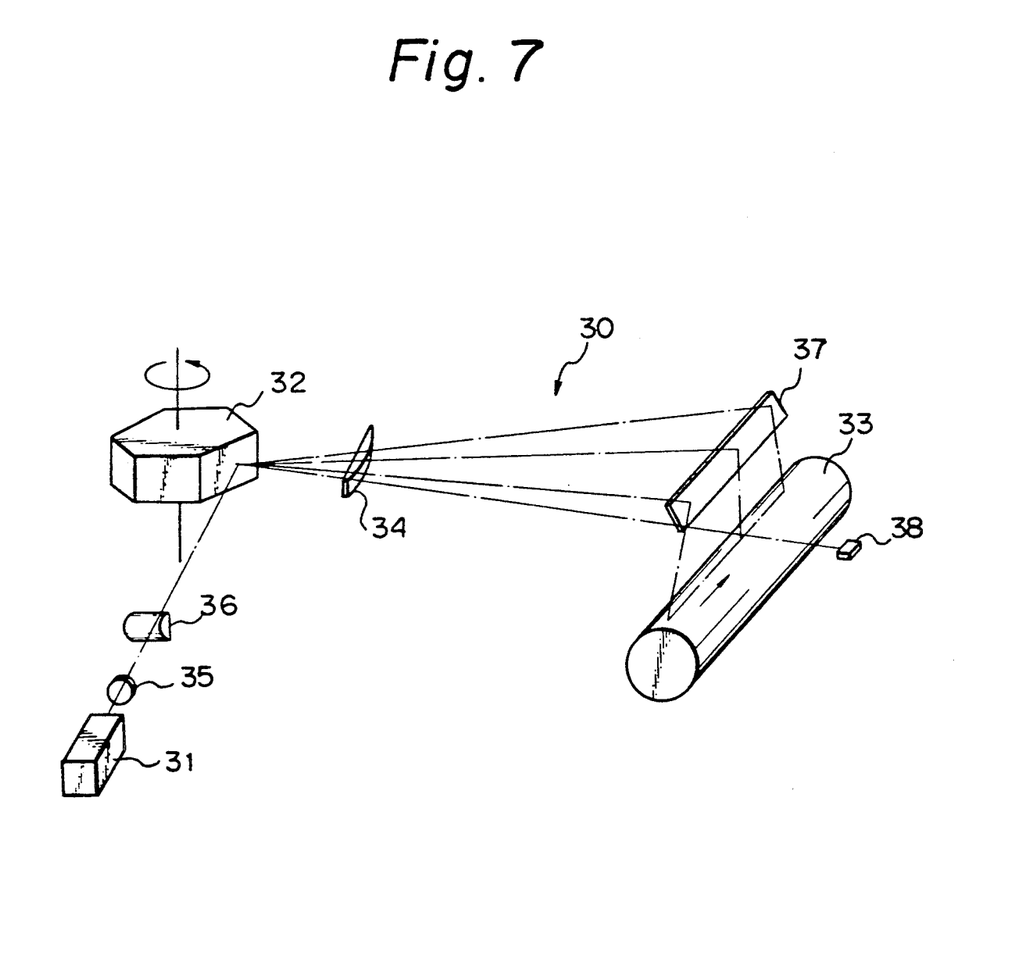
FIG. 7 is a perspective view of data writing optics of the kind using a semiconductor laser and representative of a third embodiment of the present invention.

Referring to FIGS. 7 to 12A and 12B, a third embodiment of the present invention will be described. In the figures, the same or similar components are designated by like reference numerals, and redundant description will be avoided for simplicity. Specifically, FIG. 7 shows optics 30 for writing data and of the type using a semiconductor laser. The optics 30 has a semiconductor laser 31, a polygonal mirror 32, a photoconductive drum 33, an f-theta lens 34, a converging lens 35, a cylindrical lens 36, a mirror 37, and a photodetector 38 for maintaining the write start position constant. A beam issuing from the laser 31 is transformed into parallel beam by the conversing lens 35 and then converged onto the polygonal mirror 32 in a line configuration by the cylindrical lens 36. The beam deflected by the polygonal mirror 32 is focused onto the drum 33 by the f-theta lens 34. As the polygonal mirror 32 is rotated, the beam scans the drum 33 to form a latent image thereon.

Figure 8:
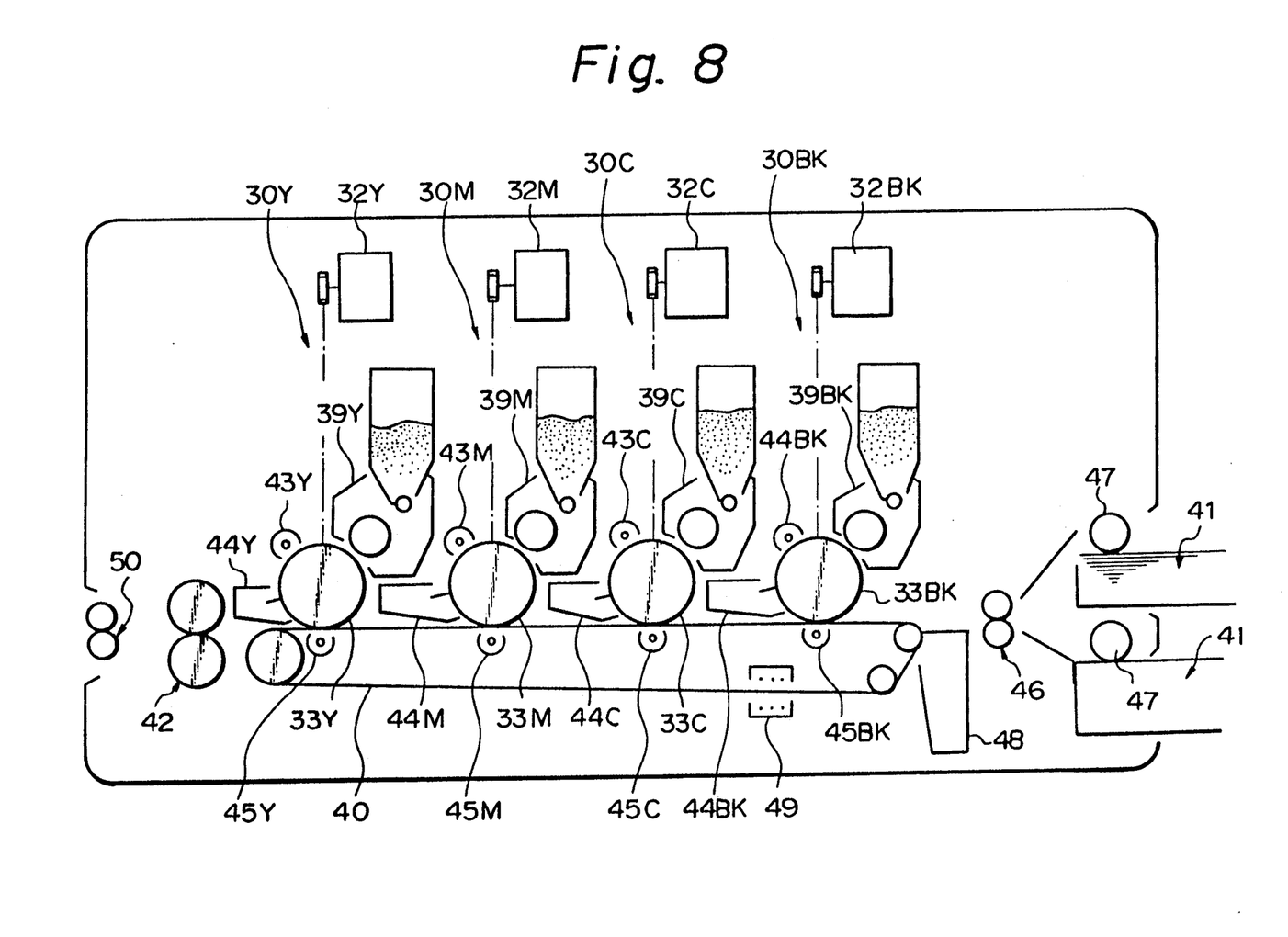
FIG. 8 is a sectional side elevation showing the general construction of a color printer having a plurality of optics and a plurality of photoconductive elements.

FIG. 8 shows the general construction of a color printer with which the third embodiment is practicable. As shown, the color printer has a plurality of optics and a plurality of photoconductive elements each being associated with respective one of the optics. The optics each is constructed in essentially the same manner as the optics shown in FIG. 7. Image signals each being representative of a particular color component produced by the color separation of a desired image, i.e., yellow (Y), magenta (M) and cyan (C) image signals are fed from a controller to form latent images associated with the individual image signals. The latent images each are developed by a particular toner associated with the color Y, M or C. The resulted toner images of different colors are sequentially transferred one above another to a single paper sheet and then fixed by a fixing unit. Use is made of a black (BK) toner not only to print out black characters with high quality but also to implement black output which is essential in the event of under-color removal.

As shown in FIG. 8, optics 30BK, 30C, 30M and 30Y are associated with photoconductive elements 33BK, 33C, 33M and 33Y, respectively. The optics 30BK to 30Y sequentially form latent images on their associated photoconductive elements 33BK to 33Y at predetermined timings. Developing units 39BK, 39C, 39M and 39Y develop the latent images which are formed on the photoconductive elements 33BK, 33C, 33M and 33Y, respectively. The developed images BK, C, M and Y are sequentially transferred to a paper sheet 41 which is held in contact with and transported by a transfer belt 40. The resultant composite color image on the paper sheet is fixed by a fixing unit 42. Concerning the optics 30, four optics each having the construction shown in FIG. 7 may be arranged side by side, or one or two of polygonal mirrors 32BK, 32C, 32M and 32Y may be provided and used in a shared arrangement, as the case may be. This is also true with the focusing lenses. Also shown in FIG. 8 are chargers 43BK, 43C, 43M and 43Y, cleaners 44BK, 44C, 44M and 44Y, separators 45BK, 45C, 45M and 45Y, a feed roller pair 46, a pick-up roller 47, a belt cleaner 48, a belt discharger 49, and a discharge roller pair 50.

Figure 9:
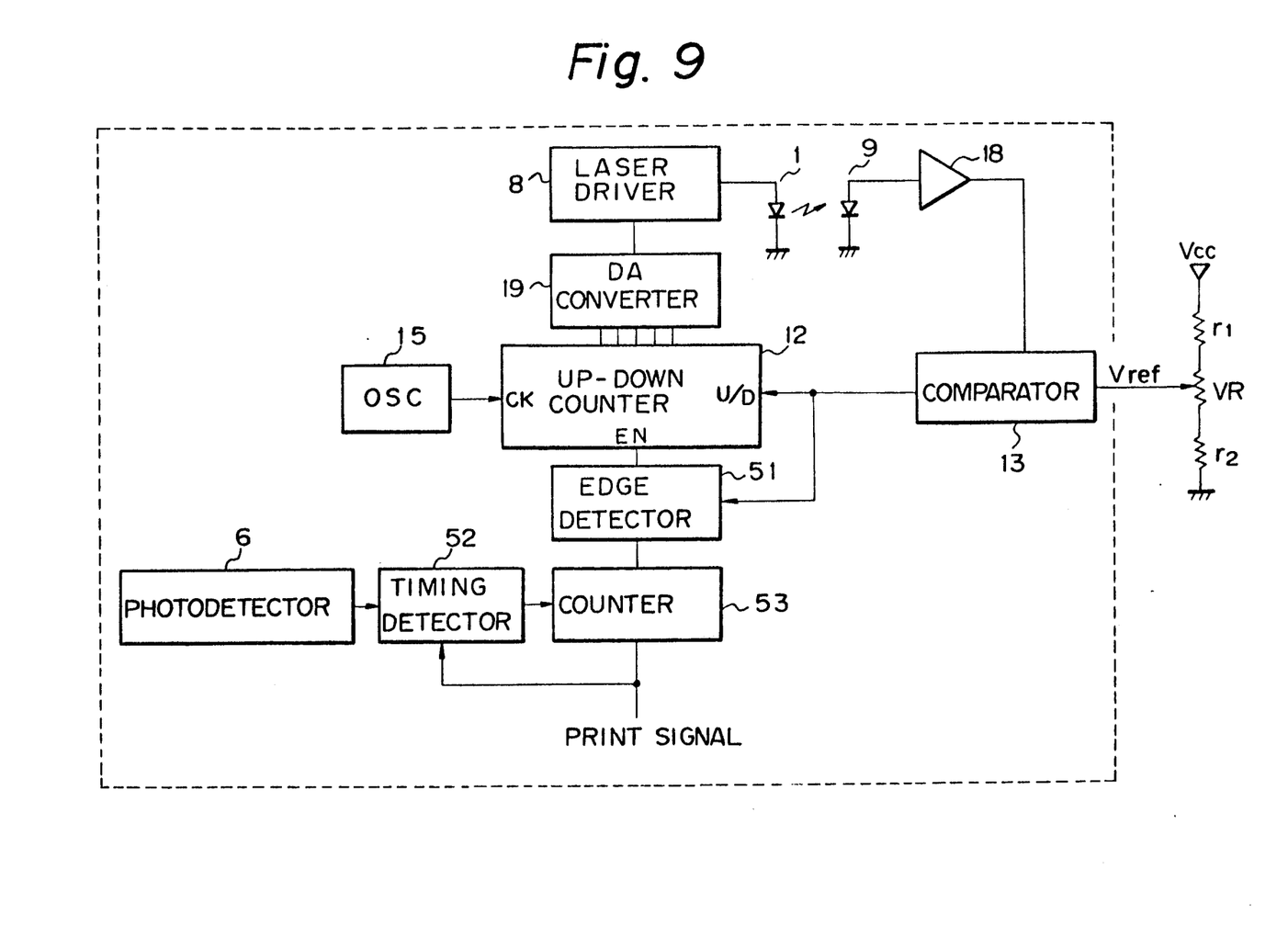
FIG. 9 is a block diagram schematically showing a controller of the third embodiment.

FIG. 9 shows the third embodiment of the controller 10 in accordance with the present invention in detail. As shown, a laser beam issuing backward from the laser 1 is incident to the photodetector 9. In response, the photodector 9 outputs a current proportional to the output level of the incident beam. This current is converted into a voltage by the amplifier 18 and then compared with the reference voltage Vref by the comparator 13. The output voltage of the comparator 13 turns to a high level or a low level depending on the result of comparison, thereby controlling the operation mode of the up-down counter 12. For example, when the output level of the beam issuing from the laser 1 is lower than the reference level, the output of the comparator 13 turns to a low level to cause the up-down counter 13 into an up-count mode. In this condition, when an edge detector 51 cancels the disabled state of the up-down counter 12, the counter 12 sequentially up-counts. A count signal from the counter 12 is transformed into an analog quantity by the DA converter 19, while the laser driver 8 increases the drive current for driving the laser 1 on the basis of the analog quantity. Hence, as the count of the counter 12 sequentially increases, the output level of the laser 1 and, therefore, the output level of the amplifier 18 is sequentially increased. On the change of the output of the comparator 13 from a low level to a high level, the edge detector 51 detects the positive-going edge of the output of the comparator 13 and applies a disable signal to the counter 12. As a result, the counter 12 is disable to hold the existing count so that the laser drive current of that moment is maintained. This maintains the output level of the beam issuing from the laser 1 constant.

Assume that the disabled state of the up-down counter 12 is cancelled when the output level of the beam from the laser 1 is higher than the reference level. Then, the up-down counter 12 is placed in a down-count with mode and down-counts the clock signal fed thereto from the oscillator 15. Hence, the output level of the beam issuing from the laser 1 is sequentially lowered. On the change of the output of the comparator 13 from a high level to a low level, the edge detector 51 detects the positive-going edge of the output of the comparator 13 and feeds a disabled signal to the counter 12. As a result, the counter 12 is disabled and holds the existing count, whereby the output level of the laser 1 is maintained.

The procedure described above is executed during a period other than an image writing period as represented by a print signal and on the basis of a predetermined frequency or in response to an externally derived trigger signal. Also shown in FIG. 9 are a timing detector 52 and a counter 53.

As stated with reference to FIG. 9, the output level of the laser beam issuing from the laser 1 is controlled such that the output of the amplifier 18 associated with the output level becomes equal to the reference voltage Vref. It follows that the output level of the beam is variable by changing the reference voltage Vref.

Figure 12A:
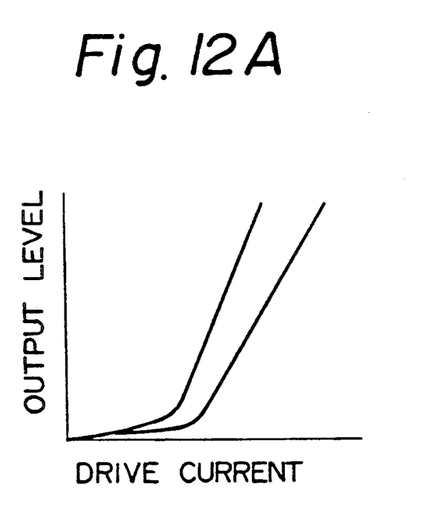
FIGS. 12A and 12B are graphs showing respectively an output level-to-drive current characteristic particular to a semiconductor laser and an output current-to-incident beam level characteristic particular to a photodetector.
Figure 12B:
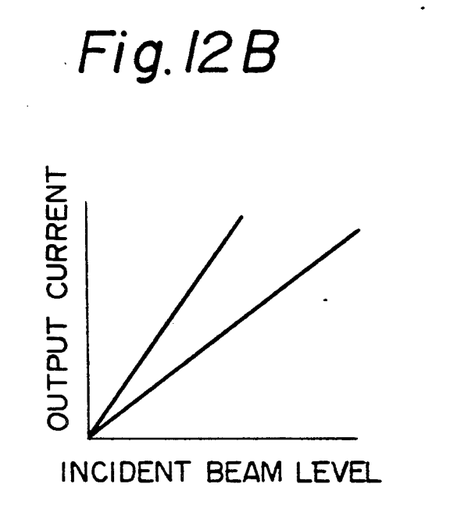

The color printer shown in FIG. 8 has four controllers each having the construction shown in FIG. 9. In general, each of such lines differs from the others with respect to the optical and electrical characteristics of the laser 1 (e.g. relationship of the output level of the laser 1 to the laser drive current, relationship of the output current of a built-in photodiode (photodetector) 9 to the incident beam level), optical attenuation characteristic of a photoconductive drum, developing and transferring characteristics of a toner, etc. Among them, the optical and electrical characteristics of the laser 1, i.e., the beam output level-to-drive current characteristic is shown in FIG. 12A, while the output current-to-incident beam level characteristic is shown in FIG. 12B. As FIGS. 12A and 12B indicate, when the same reference level Vref is assigned to all the colors, the output level of the laser beam can be maintained the same if the amplification degree γ of the amplifier 18 is adjusted. Hence, it is not necessary to take account of the irregularities in the optical and electrical characteristics of the laser 1 among colors and machines. Specifically, assume that the semiconductor laser 1, photodetector 9 and amplifier 18 having an adjusted amplification degree γ are constructed into a single replaceable part. Then, when the laser 1 is damaged, adequate output images are achievable simply by replacing the single part, because the same reference voltage Vref results in the same beam output level.

Nevertheless, should the same beam output level be assigned to all the colors, the required gamma characteristic would not be realized and it would be necessary to adjust the beam output level more finely when it comes to color images which are extremely minute and high-tone, due to irregularities in the optical attenuation of the drum 33, developing and transferring characteristics of a toner, etc. In the light of this, the illustrative embodiment is so constructed as to allow the reference voltage to be finely adjusted color by color, as shown in FIG. 9. FIG. 9 shows a specific arrangement wherein the reference voltage Vref is adjusted by resistances $r_1$, VR and $r_2$. The resistances $r_1$, VR and $r_2$ may be replaced with an integrated circuit which is generally referred to as an electronic volume. With such an arrangement, it is possible to set the gamma characteristic as designed color by color.

Figure 10:
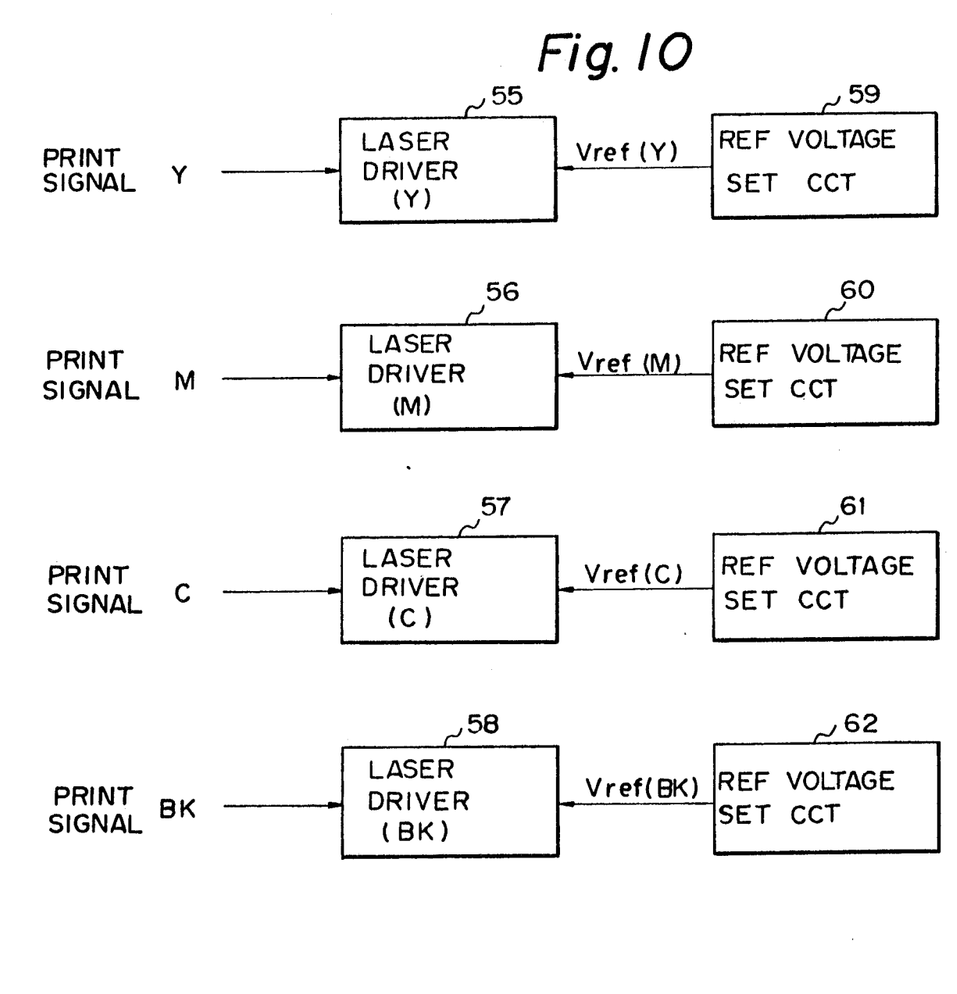
FIG. 10 is a block diagram showing a laser driving section of the color printer of FIG. 8 schematically.
Figure 11:
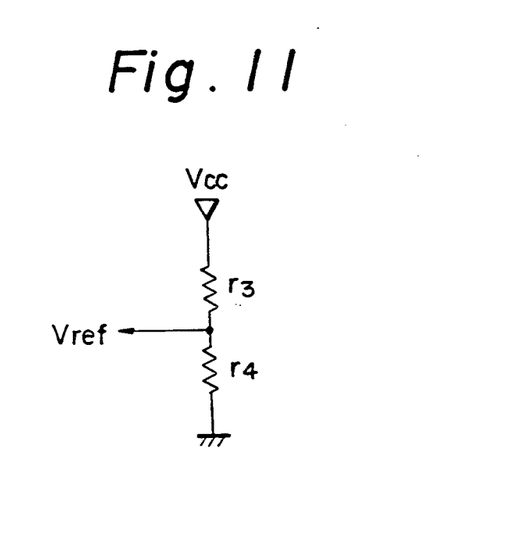
FIG. 11 is a diagram schematically showing a modification of a reference voltage setting circuit included in the controller of FIG. 9.

Let the section of FIG. 9 surrounded by a dashed line be called a laser driving section for convenience. Then, the laser driving section may be drawn as shown in FIG. 10 which corresponds to FIG. 8. In FIG. 10, the reference numerals 55, 56, 57 and 58 are laser driving sections associated with the individual colors (Y, M, C and BK). Reference voltage setting circuits 59, 60, 61 and 62 are interconnected to the laser driving sections 55, 56, 57 and 58, respectively. The laser driving sections 55 to 58 control the output levels of the associated laser beams in response to associated reference voltages Vref(Y), Vref(M), Vref(C) and Vref(BK) which are generated by the reference voltage setting circuits 59 to 62. It should be born in mind that the reference voltages Vref (Y) to Vref (BK) are not always the same as one another. The reference voltage setting circuits 59 to 62 each correspond to the connection of registors $r_1$, VR and $r_2$ shown in FIG. 9. As shown in FIG. 11, the reference voltage setting circuits 59 to 62 may each be implemented as a simple connection of resistors $r_3$ and $r_4$, so long as such a connection is allowable in the image quality aspect.

As stated above, the third embodiment is capable of compensating for the irregularities in gamma characteristic ascribable to the individual semiconductor lasers, toners and photoconductive drums each being assigned to a particular color, by adjusting the beam output level laser by laser. This insures high-quality images, promotes the ease of fine adjustment due to the variable reference voltages Vref, and compensates for changes ascriable to aging by adjusting the reference voltages Vref. The image quality is further enhanced because the output level can be adjusted laser by laser in conformity to the conditions particular to the individual colors. When changing the reference voltages Vref is not necessary, e.g., when fine adjustment is not needed or when changes due to aging are not noticeable, it suffices to set the reference values Vref color by color beforehand. This saves the time and labor otherwise consumed by adjustment.

In summary, it will be seen that the present invention sets an output level of a scanning beam in response to data fed from the outside and, therefore, copes with changes in image forming conditions and changes in various characteristics due to aging.

Further, when the present invention is applied to a color printer or similar image recorder, it sets an output level beam by beam in matching relation to the characteristics of individual colors and thereby improves color balance.

Various modifications will become possible for those skilled in the art after receiving the teachings of the present disclosure without departing from the scope thereof. For example, while the present invention has been shown and described in relation to an image recorder of the type using a semiconductor laser, it is similarly practicable with any other light source such as a gas laser (He-Ne laser).

What is claimed is:

1. A device for controlling an output level of a scanning beam issuing from beam generating means to a predetermined level, comprising:

output level detecting means for detecting an output level of the scanning beam issuing from the beam generating means;

comparing means for comparing an output signal of said output level detecting means with a reference signal;

output level setting means for setting an output level of the scanning beam in response to an output signal of said comparing means; and reference signal level setting means for variably setting a level of the reference signal in response to scanning beam output data which is fed to said device;

whereby the output level of the scanning beam is variably set in response to the scanning beam output data.

2. A device as claimed in claim 1, wherein said reference signal level setting means variably sets the reference signal in response to at least two sequences of scanning beam output data which are fed to said device from the outside, thereby variably setting the output level of the scanning beam in response to said data.

3. A device as claimed in claim 1, wherein at least two sequences of scanning beam output data are fed to said device, one of said two sequences of data being set at the inside of said device.

4. An image recorder comprising:

deflecting means for deflecting a plurality of scanning beams each having been modulated by an input image signal onto individual photoconductive elements;

output level setting means each for setting an output level of a respective one of the plurality of scanning means;

whereby the output levels of the scanning beams each is variably set by an associated one of said output level setting means;

comparing means for comparing said output levels with a respective reference signal; and reference signal level setting means for variably setting said reference signals.

5. A device as claimed in claim 1, wherein said reference signal level setting means further comprises:
input means for inputting said scanning beam output data and for outputting said scanning beam output data in response to an external signal; and
conversion means for converting said output scanning beam output data into said reference signal.

6. A device as claimed in claim 1, wherein said reference signal level setting means further comprises:
first input means for inputting a first sequence of scanning beam output data and outputting said first sequence in response to a first external signal;
first conversion means for converting said output first sequence into a first voltage signal;
second input means for inputting a second sequence of said scanning beam output data and for outputting said second sequence in response to a second external signal;
second conversion means for converting said output second sequence into a second voltage signal; and
third conversion means for converting said first and second voltage signals into said reference signal.

7. A device as claimed in claim 1, wherein said reference signal setting means has an adjustable variable reference signal setting range.

8. A device as claimed in claim 1, further comprising:
means for detecting a change in a characteristic of a photoconductive element and outputting a detection signal, said scanning beam output data being associated with said detection signal;
wherein said reference signal level setting means sets said reference signal level by varying a fixed potential using said scanning beam output data.

9. A device as claimed in claim 4, wherein said reference signal level setting means further comprises:
input means for inputting said scanning beam output data and for outputting said scanning beam output data in response to an external signal; and
conversion means for converting said output scanning beam output data into said reference signal.

10. A device as claimed in claim 4, wherein said reference signal level setting means further comprises:
first input means for inputting a first sequence of scanning beam output data and outputting said first sequence in response to a first external signal;
first conversion means for converting said output first sequence into a first voltage signal;
second input means for inputting a second sequence of said scanning beam output data and for outputting said second sequence in response to a second external signal;
second conversion means for converting said output second sequence into a second voltage signal; and
third conversion means for converting said first and second voltage signals into said reference signal.

11. A device as claimed in claim 4, wherein said comparing means comprises a plurality of means each for comparing one of said output levels with a respective one of said reference signals; and
wherein said reference signal level setting means comprises a plurality of means each variably setting a respective one of said reference signals.

12. A device as claimed in claim 4, wherein said reference signal setting means has an adjustable variable reference signal setting range.

13. A device as claimed in claim 4, further comprising:
means for detecting a change in a characteristic of said photoconductive element and outputting a detection signal, said scanning beam output data being associated with said detection signal;
wherein said reference signal level setting means sets said reference signal level by varying a fixed potential using said scanning beam output data.

* * * * *